United States Patent [19]

Sweet et al.

[11] 3,961,826

[45] June 8, 1976

[54] SUSPENSION UNIT

[75] Inventors: Phillip J. Sweet; Buck C. Hamlet; David L. Sweet, all of Fresno, Calif.

[73] Assignee: American Carrier Equipment, Inc., Fresno, Calif.

[22] Filed: Mar. 6, 1975

[21] Appl. No.: 555,892

[52] U.S. Cl................................ 301/125; 267/15 A; 280/702
[51] Int. Cl.².......................................... B60G 11/56
[58] Field of Search....................... 301/124 R, 125; 280/124 F, 94, 6, 125; 267/15 R, 15 A, 18, 31, 16, 17 R, 20 R, 21 R

[56] References Cited
UNITED STATES PATENTS

| | | | |
|---|---|---|---|
| 2,874,956 | 2/1959 | La Belle............................... | 267/18 |
| 3,140,880 | 7/1964 | Masser............................ | 280/124 F |
| 3,694,001 | 9/1972 | McGee............................ | 267/15 A |

*Primary Examiner*—Allen N. Knowles
*Assistant Examiner*—D. W. Keen
*Attorney, Agent, or Firm*—Huebner & Worrel

[57] ABSTRACT

An improved suspension unit for an overland vehicle of the type including a body-supporting frame and a wheel-supporting axle. The unit is characterized by a bracket adapted to be rigidly affixed to the frame of a selected vehicle, a rigid arm of a substantially angulated configuration, including a base segment and a distal segment, a knuckle joint for pivotally connecting the base segment of the arm to the bracket, a relief defined in the arm for receiving the axle of the vehicle in a captured relationship, and a pressurized air bag of a substantially constant height interposed between the bracket and the distal segment of the arm for continuously supporting the vehicle in a continuous air-ride configuration.

6 Claims, 6 Drawing Figures

SUSPENSION UNIT

BACKGROUND OF THE INVENTION

The invention generally relates to suspension systems for overland vehicles of the type including a body-supporting frame and a wheel-supported axle, and more particularly to an improved, lightweight suspension unit which is economic to manufacture and simple to install.

Heretofore, it has been common practice to provide trailers and similar vehicles with suspension systems including coil springs, leaf springs, air springs and combinations of coil springs and leaf springs with air bags, sometimes referred to as air springs. Such systems are typified by suspension systems disclosed and claimed in applicants' prior U.S. Pat. No. 3,782,753 and application Ser. No. 401,241, now U.S. Pat. No. 3,866,894.

While the suspension systems of the type hereinbefore mentioned generally serve quite satisfactorily for their intended purpose, it has been found that it is desirable to further reduce the mass of suspension systems and to further simplify fabrication and installation procedures, in order to improve the efficiency of the systems. This need is particularly emphasized by the prevailing energy shortage which imposes on manufacturers the requirement that production techniques be refined, and further imposes upon truckers the requirement that the payload-weight to vehicle-weight ratio be maximized, in order to conserve energy.

It is, therefore, the general purpose of the instant invention to provide an improved suspension unit for overland vehicles which is simple and economic to fabricate and install, and which is of a relatively lightweight construction, whereby substantial savings in vehicle weight can be realized with an attendant reduction in energy consumption.

OBJECTS AND SUMMARY OF THE INVENTION

It is an object of the instant invention to provide an improved suspension unit for overland vehicles.

It is another object to provide a lightweight suspension unit for use in suspension systems for overland vehicles.

It is another object to provide a lightweight suspension unit which is economic to fabricate and to install.

It is another object to provide an improved, lightweight suspension unit which includes an air bag having a substantially constant height supported by a rigid arm fixedly mounted on the axle of a selected vehicle.

It is another object to provide a practical, economic, lightweight suspension unit having included therein a rigid arm pivotally connected to the frame of a selected vehicle and rigidly affixed to the axle of the vehicle and an air bag of a substantially constant height interconnected between the arm and the frame, whereby a continuous air ride is imparted to the vehicle independently of leaf springs and the like.

These and other objects and advantages are achieved through the use of a suspension unit which includes a bracket adapted to be rigidly affixed beneath the frame of a selected vehicle, a rigid arm of a substantially angulated configuration pivotally connected to the bracket and rigidly affixed to a load-supporting axle for the vehicle and an air bag of a substantially constant height interposed in supporting relationship between the arm and the frame for supporting the frame in a continuous air-ride mode, as will hereinafter become more readily apparent by reference to the following description and claims in light of the accompanying drawings.

DESCRIPTION OF THE PREFERRED EMBODIMENT

Figure 1:
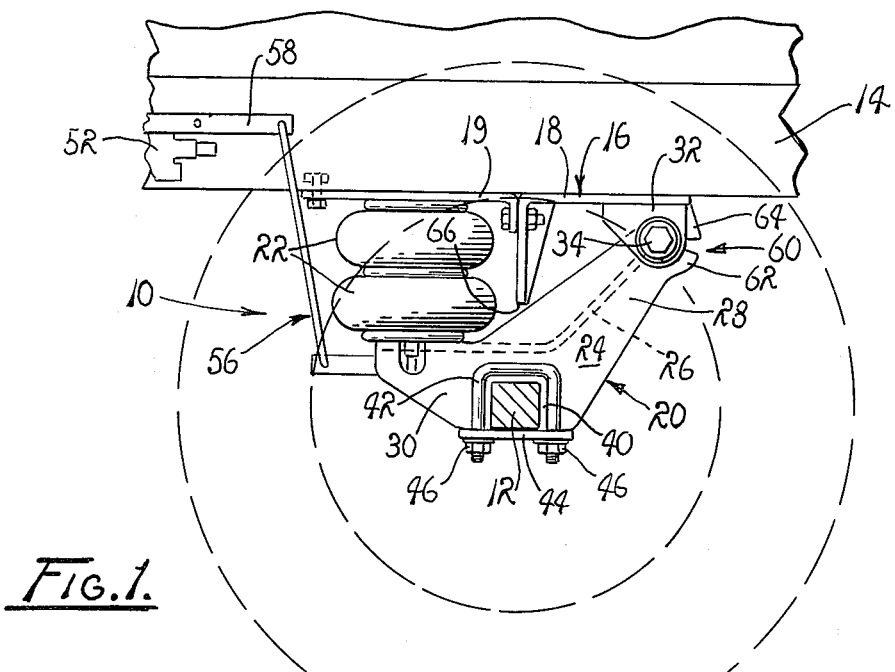
FIG. 1 is a partially sectioned, side elevation illustrating the suspension system which embodies the principles of the instant invention.

Referring now with more particularity to the drawings wherein like reference characters designate like or corresponding parts throughout the several views, there is shown in FIG. 1 a suspension unit, generally designated 10, which embodies the principles of the instant invention.

As illustrated in FIG. 1, the suspension unit 10 is mounted between a wheel-supported axle 12 and a longitudinal frame member 14 of an overland vehicle, such as a truck or the like. While the suspension unit 10 is particularly suited for use with overland vehicles, such as trucks and the like, it is to be understood that the utility of the unit is not so limited since it may be employed for supporting vehicles of other types and classes including buses, automobiles, tractors, and trailers intended for off-highway usage, as well as for highway usage.

The unit 10, as illustrated, is connected with the longitudinal frame member 14 through a bracket 16, bolted, welded or otherwise rigidly affixed to the frame member 14. Preferably, the bracket 16 is of a modular construction and includes a base module 18 and a distal module 19. The distal module is connected in axial alignment with the base module through a use of suitable fasteners, not designated, such as bolts and the like.

Pivotally connected to the bracket 16 is an angulated arm, generally designated 20, which is supported by the axle 12 and serves, in turn, as a supporting base for an air bag 22 interposed between the arm and the distal module 18 of the bracket 16. The arm 20 is of an integral, rigid construction, preferably fabricated by using suitable casting and machining techniques. It is important to appreciate that the arm 20 is substantially inflexible and includes a pair of reinforcing side components 24 interconnected through a central web 26 extended between the components 24. The side components 24 are arranged in substantial parallelism and include a pair of substantially flat plates so configured as to impart to the arm 20 an angulated configuration. Thus the arm 20 is configured to include a base segment 28 and a distal segment 30, so related to the base segment as to define therebetween an included angle greater than 90°.

As a practical matter, the air bag 22 is interposed between and fixed to the distal segment 30 of the arm 20 and the distal module 19 of the bracket 16. Consequently, due to the modular construction of the bracket 16, removal of the air bag 22 is facilitated without necessitating a removal of the unit 10 from the vehicle to which it is attached.

The web 26 provides a suitable seat for the air bag 22 which is connected therewith through the use of suitable fasteners, including screw studs and the like, not designated. The air bag 22 is similarly connected to the module 19 of the bracket 16.

Integral with the base module 18 of the bracket 16, there is a depending shackle 32 of a substantially inverted U-shaped configuration. The shackle 32 serves to receive therein the end portion of the base segment 28 of the arm 20 and is connected thereto through a suitable knuckle pin 34 extended through coaxially aligned openings provided in the shackle and the arm, in a manner well understood by those familiar with the fabrication and mounting of suspension systems. Thus there is provided a knuckle joint, designated 36, through which the arm 20 is pivotally connected with the bracket 16.

The arm 20 is provided with a pair of coaxially aligned, downwardly opening apertures 38 which serve to receive therein the axle 12 of the vehicle in a captured relationship. Extended axially through the arm and projected from each of the side components 24 there is an elongated collar 40, of an inverted U-shaped cross-sectional configuration, the extended ends of which serve as saddles for a U-bolt 42. The U-bolts are seated in an inverted orientation and connected with a plate 44 extended therebetween beneath the axle 12. As a practical matter, the threaded ends of the legs of the U-bolts 42 extend through suitably formed apertures, not designated, provided in the plate 44 and connected with the plate through nuts 46 screw threaded onto the threaded ends of the legs.

It should, therefore, be apparent that the weight of the vehicle is partially supported by the axle 12 acting through the arm 20, which is connected in supporting relation with the bracket 16 through the air bag 22 and the knuckle joint 36.

Figure 6:
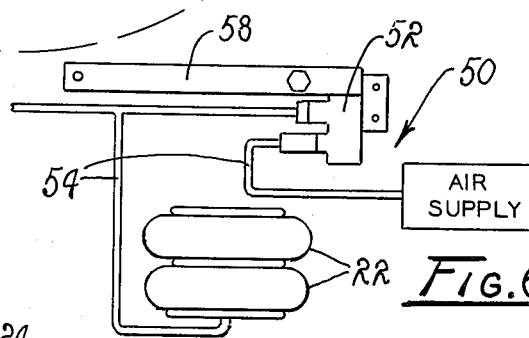
FIG. 6 is a diagrammatic view of a pneumatic circuit provided for controlling pressurization of the air bag shown in FIGS. 1 through 5.
Figure 2:
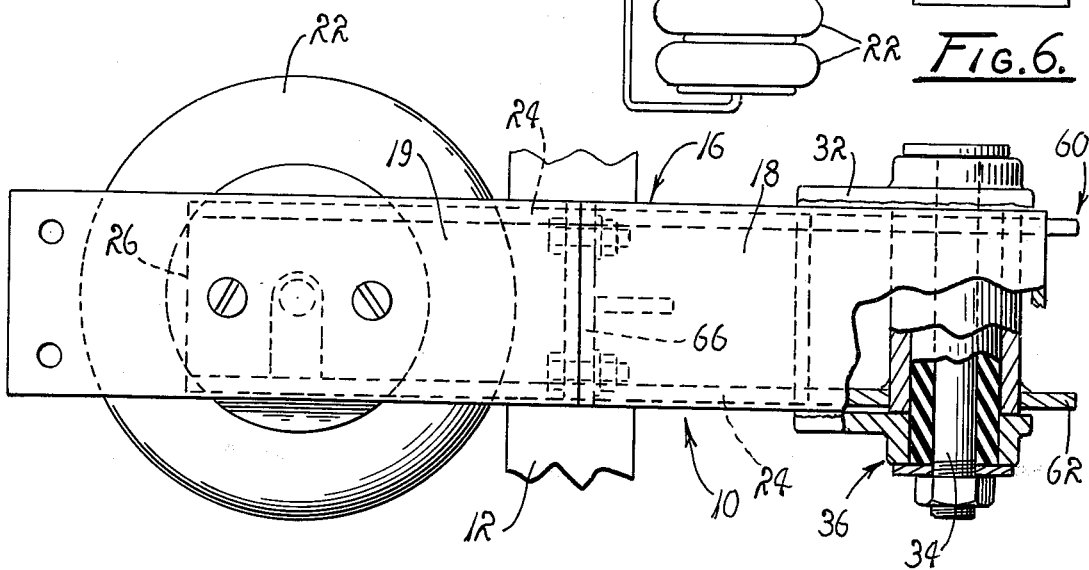
FIG. 2 is a top plan view of the suspension unit.
Figure 3:
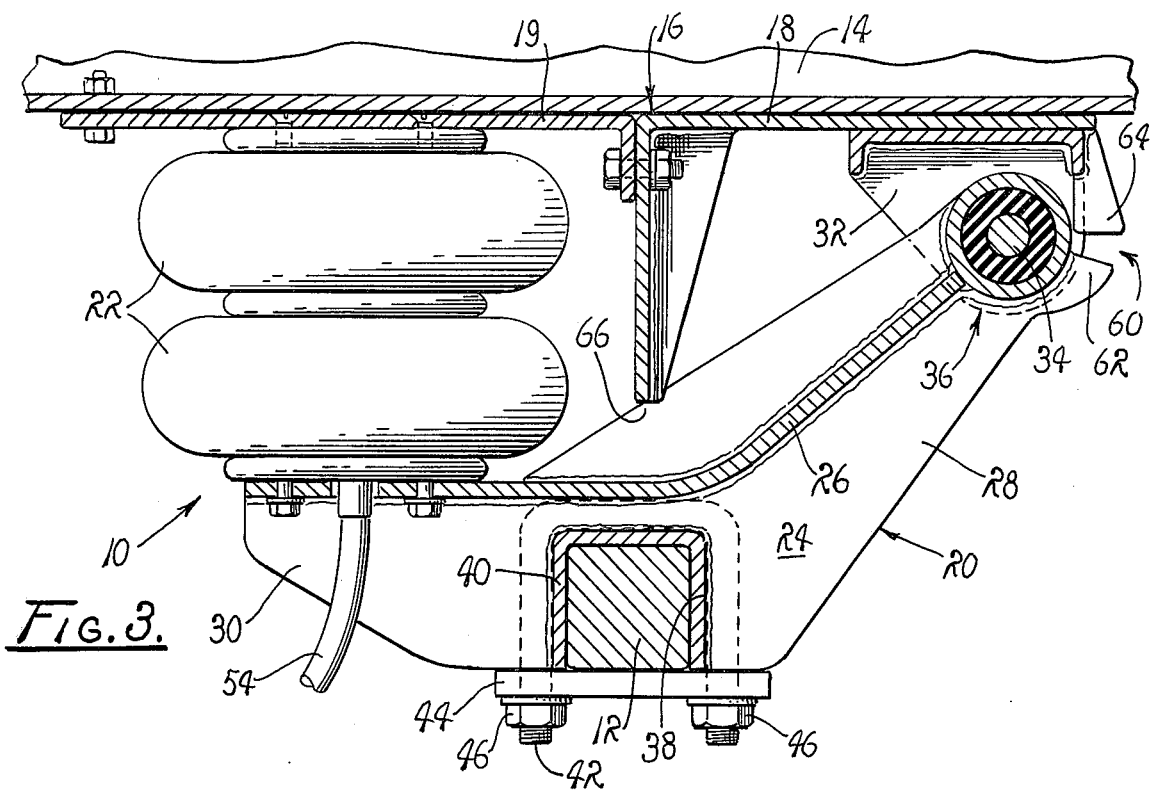
FIG. 3 is a partially sectioned, side elevational view of the suspension unit.
Figure 4:
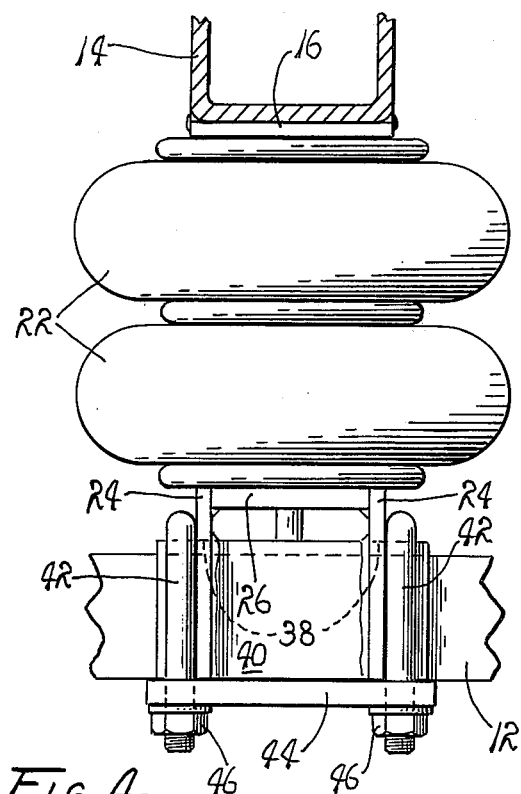
FIG. 4 is a partially sectioned, end elevational view of the unit.
Figure 5:
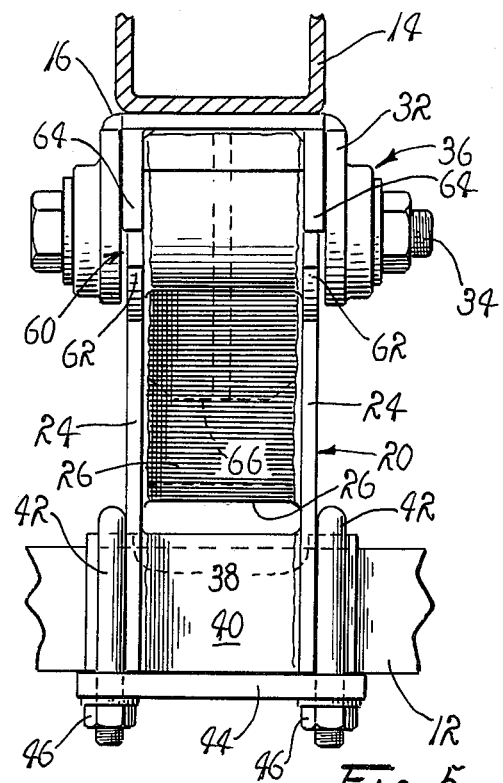
FIG. 5 is a partially sectioned, end elevational view of the unit, taken from the end thereof opposite that illustrated in FIG. 4.

In order to impart a continuous air-ride capability to the unit 10, the air bag is connected with a suitable air supply, not designated, through a pneumatic circuit, generally designated 50, FIG. 6.

In practice, the pneumatic circuit 50 includes a height control valve 52 interconnected in a pressure line 54 extended from the air supply to the air bag 22 and is connected therewith through suitable fittings, also not designated. As a practical matter, the height control valve 52 includes a pivotal linkage, generally designated 56, FIG. 1, having one end connected with the arm 20 and the opposite end thereof connected with an actuating lever 58 for the height control valve 52 so that the height control valve is actuated in response to changes in the position of the arm 20, for thereby varying the pressure within the air bag 22 either by connecting the air supply to the air bag or by venting the air bag to atmosphere.

Since the design and function of height control valves are well understood, a more detailed description of the height control valve 52 is omitted in the interest of brevity. However, it is to be understood that in the event the air bag 22 becomes over expanded, the pressure within the bag is relieved through the height control valve 52, while a pressurization of the bag 22 is initiated in the event a collapse of the bag is experienced.

In order to limit the downward motion of the arm 20, relative to the bracket 16, there is provided a stop, generally designated 60. This stop includes a pair of ears 62 welded to the base segment 28 of the arm 20 in juxtaposition with the knuckle joint 36, and a pair of mating ears 64 welded to the shackle 32 in a position to engage the ears 62 as excessive downward pivotal motion is imparted to the arm 20.

Similarly, a depending stop 66, which extends downwardly from the bracket 16, is provided within a path of the arm 20 as pivotal motion in an upward direction is imparted to the arm 20 for arresting such upward motion in order to prevent a total collapse of the bag 22.

It should, therefore, be apparent that the throw of the arm, in both upward and downward directions, is limited by positive stops, while the unit 10, in effect, functions in a substantially continuous air-ride mode.

OPERATION

It is believed that in view of the foregoing description, the operation of the device will readily be understood and it will be briefly reviewed at this point.

With the unit 10 assembled in the manner hereinbefore described, and rigidly affixed in a depending relationship beneath a longitudinal frame member 14 of a selected vehicle, the unit 10 is employable in a continuous air-ride mode for resiliently supporting an overland vehicle independently of auxiliary springs and the like.

Prior to being put into operation, the air bag 22 of the unit 10 is suitably pressurized with the height control valve 52 being properly set so that as excessive motion in a downward direction is imparted to the arm, resulting in over expansion of the air bag, pressure is relieved from the air bag. Similarly, in the event the arm 20 is moved upwardly for excessively collapsing the air bag 22, pressure is introduced into the bag from the air supply, via the height control valve 52. Thus, the unit 10 is caused to function in a continuous air-ride mode as the weight of the vehicle is transmitted through the air bag 22 and knuckle joint 36 to the arm 20 and thence to the axle 12.

In view of the foregoing, it should readily be apparent that the suspension unit of the instant invention provides a practical solution to the problem of achieving efficiency and economy in the fabrication of suspension systems without impairing the function thereof.

Although the invention has been herein shown and described in what is conceived to be the most practical and preferred embodiment, it is recognized that departures may be made therefrom within the scope of the invention, which is not to be limited to the illustrative details disclosed.

Having described our invention, what we claim as new and desire to secure by Letters Patent is:

1. An improved suspension unit for an overland vehicle of the type including a body-supporting frame and a wheel-supported axle, comprising:
   A. a bracket adapted to be disposed beneath the frame of a selected vehicle and rigidly connected thereto;
   B. a rigid arm of a substantially angulated configuration including a base segment and a distal segment angularly related to said base segment;
   C. means including a knuckle joint for pivotally connecting said base segment of the arm to the bracket;

D. means adapted to rigidly connect the axle of the vehicle to the distal segment of the arm;

E. means adapted to resiliently support the vehicle including a pressurized air bag of a substantially constant height interposed between the bracket and the distal segment of the arm; and F. stop means for said arm including a first pair of protrusions extended from the base segment of said arm in juxtaposition with said knuckle joint, a second pair of protrusions extended from said bracket into the path of said first pair of protrusions, for limiting pivotal motion imparted to said arm in a downward direction, and a rigid stop depending from said bracket in a vertical plane passing through said arm for limiting pivotal motion imparted to said arm in an upward direction.

2. The unit of claim 1 wherein said bracket is of modular construction and includes a first module to which said one end of the arm is connected and a second module to which said air bag is connected.

3. The unit of claim 1 wherein said arm comprises a casting including a pair of laterally spaced, angulated side components disposed in substantial parallelism, and an angulated web extended between said components.

4. The unit of claim 3 further comprising:
pneumatic circuit means connected with said air bag for maintaining the height thereof substantially constant, including a source of air under pressure and a height control valve connected to said arm and interposed in said circuit means between said source of air and said air bag.

5. The unit of claim 3 wherein said means for rigidly connecting the axle of the vehicle to said arm includes means defining in said pair of side components a pair of reliefs for receiving said axle in a captured relationship.

6. In combination with an overland vehicle including a body-supporting frame and a wheel-supported axle, a suspension unit comprising:

A. a bracket including a first module having a depending shackle of a substantially inverted U-shaped configuration and a second module disposed in alignment with said first module and releasably connected thereto, disposed beneath the frame of the vehicle and rigidly mounted thereon;

B. a casting comprising a rigid arm of an angulated configuration including a pair of laterally spaced side components of angular configurations disposed in substantial parallelism, and a web extended between said side components;

C. means including a knuckle joint for pivotally connecting one end of said arm to the shackle;

D. stop means for said arm including a first pair of protrusions extended from the base segment of said arm in juxtaposition with said knuckle joint, a second pair of protrusions extended from said bracket into the path of said first pair of protrusions, for limiting pivotal motion imparted to said arm in a downward direction, and a rigid stop depending from said bracket in a vertical plane passing through said arm for limiting pivotal motion imparted to said arm in an upward direction;

E. means defining in said side components a pair of coaxially aligned reliefs for receiving the axle of the vehicle in a captured relation, and means including a pair of U-bolts for releasably securing said axle in captured relation with said arm;

F. means for resiliently supporting the vehicle including a pressurized air bag of a substantially constant height interposed between the end of said arm, opposite said first end, and the second module of said bracket; and G. a pneumatic circuit connected with said air bag for continuously maintaining the air bag at a substantially constant height, including a source of air under pressure, a height control valve mounted on said frame and interposed in said circuit between said source of air and the air bag for controlling the delivery of air under pressure thereto, and a height control lever rigidly affixed to said arm and pivotally connected with said valve for actuating said valve in response to pivotal motion imparted to said arm.

* * * * *